July 14, 1925.
J. F. POE
1,545,792
FRAME SUPPORTING MEANS FOR BEEHIVES
Filed May 12, 1924
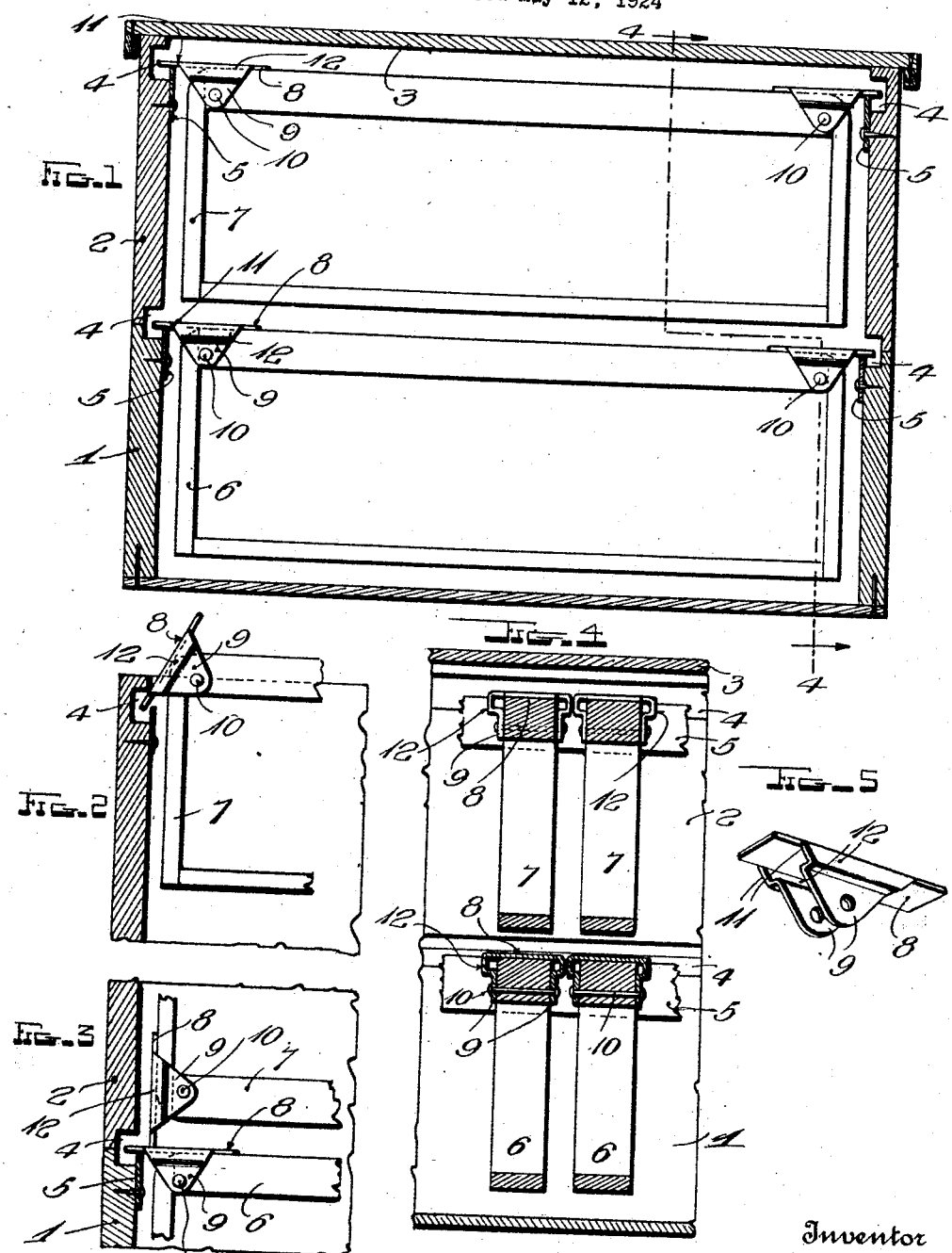
Inventor
J. F. Poe
By H. B. Wilson & Co.
Attorneys Patented July 14, 1925.

1,545,792

UNITED STATES PATENT OFFICE.

JOHN F. POE, OF WEST HUNTINGTON, WEST VIRGINIA.

FRAME-SUPPORTING MEANS FOR BEEHIVES.

Application filed May 12, 1924. Serial No. 712,760.

*To all whom it may concern:*

Be it known that I, JOHN F. POE, a citizen of the United States, residing at West Huntington, in the county of Cabell and State of West Virginia, have invented certain new and useful Improvements in Frame-Supporting Means for Beehives; and I do declare the following to be a full, clear, and exact description of the invention, such as will enable others skilled in the art to which it appertains to make and use the same.

My invention aims to provide a new and improved means for supporting the usual brood frames and comb honey frames in bee hives, in such manner that said frames may be quickly and easily removed, and will be supported in properly spaced relation for use, provision being also made whereby the comb honey frames in a super over a brood chamber may be held in an inverted position after partially filled with honey by the bees, so that the latter will then complete the filling operation, it being well known that the bees work downwardly from the tops of the frames and very often will not complete the honey formation entirely to the lower sides thereof.

With the foregoing and minor objects in view, the invention resides in the novel subject matter hereinafter described and claimed, the description being supplemented by the accompanying drawing.

Figure 1 is a vertical sectional view showing a brood frame and a comb honey frame supported in a hive in accordance with the invention.

Figure 2 is a fragmentary view similar to a portion of Fig. 1, showing the position of the frame-supporting means when a frame is being inserted or removed.

Figure 3 is a view similar to Fig. 2 but illustrating the manner in which the comb honey frames may be supported in inverted position.

Figure 4 is a vertical transverse sectional view on line 4—4 of Fig. 1.

Figure 5 is a detail perspective view of one of the frame supports.

In the drawing above briefly described, I have illustrated a bee hive comprising a brood chamber 1, a super 2 resting upon said brood chamber, and a removable top 3. Opposed walls of the brood chamber and super are formed with recesses in their inner sides, which recesses are preferably in the form of horizontal grooves 4, and metal strips 5 are preferably secured to the inner sides of said walls with their upper edge portions projecting slightly above the lower side walls of said grooves. These grooves are co-operable with the novel supporting means yet to be described, for the brood frames 6 and the comb honey frames 7, which frames are disposed respectively in the chamber 1 and the super 2.

The improved supporting devices are disposed at the upper corners of the frames 6 and 7, the ends of said devices being insertible into the grooves 4 to rest on the strips 5 and support the frames, and being readily withdrawn from the grooves so that any desired number of the frames may be quickly and easily removed. In the preferred construction, each of the supporting devices comprises a horizontal, elongated, sheet metal plate 8 which normally rests upon the frame with which it is associated, said plate having a pair of integral, parallel, side flanges 9 which straddle the frame and are pivoted thereto as indicated at 10. The pivots permit swinging of the plates 8 from horizontal to vertical positions and when said plates are disposed vertically, as shown in Fig. 2, the frames are readily insertible or removed. When inserting a frame with its plates 8 vertically disposed, these plates are rocked around the pivots 10, to horizontal positions, as soon as their lower ends come opposite the grooves 4. Thus, these ends will project horizontally from the frames and are received in the grooves, to support said frames.

The outer edges 11, of the flanges 9, adjacent the plates 8, terminate in inwardly spaced relation with the outer ends of said plates, but in outwardly spaced relation with the ends of the frames. Thus, they form shoulders to engage the strips 5 and hold the ends of the frames in properly spaced relation with the hive walls. Also, the flanges 9 preferably have outwardly bent portions 12 which project laterally from the frames and form spacers for disposing said frames in proper horizontally spaced relation.

When the frames are supported as shown in Fig. 1, the bees will fill the upper portions thereof, but not the lower portions. Then, these frames 7 may be removed and reinserted as shown in Fig. 3, the plates 8 being then swung to vertical positions, so that they rest on the lower frames 6 to support the aforesaid frames 7 in inverted position. Then, the bees will work downwardly from what are then the upper sides of the frames 7 and complete the filling operation.

The invention is simple and inexpensive, yet is very desirable and convenient to operate. Particular attention is directed to the fact that a number of the upper frames 7 may be removed after first removing the top 3, permitting a few of the lower frames to also be removed, without taking the super 2 from the brood chamber and standing the chance of having cold weather chill the bees. Removal of a number of the frames permits conditions in the brood chamber to be readily inspected, and after such inspection, the frames may be easily replaced.

As excellent results may be obtained from the details disclosed, they are by preference followed, but within the scope of the invention as claimed, numerous minor changes may be made.

I claim:

1. In a means for supporting a vertical frame in a bee hive; supporting members on the ends of the frame movable from horizontal to vertical positions for reception in recesses in opposed walls of the hive when in horizontal positions.

2. In a means for supporting a vertical frame in a bee hive; supporting members pivoted to the ends of the frame and movable from vertical to horizontal positions, said members when horizontally positioned projecting from said frame for reception in recesses in opposed walls of the hive, and when vertically positioned being adapted to clear the recesses.

3. In a means for supporting a vertical frame in a bee hive; supporting plates at the upper corners of the frame normally resting on the top bar thereof and projecting beyond the end bars of said frame for reception in recesses in opposed walls of a hive, flanges extending downwardly from said plates, and transverse horizontal pivots connecting said flanges with the frames and permitting movement of the plates to vertical positions to free them from the recesses.

4. A structure as specified in claim 1; said supporting members having portions projecting laterally from the frame to space the latter from an adjacent frame.

5. A structure as specified in claim 3; said flanges having portions projecting laterally from the frame to space the latter from an adjacent frame.

6. A structure as specified in claim 1; said supporting members having shoulders to abut said walls and space the frame therefrom.

7. A structure as specified in claim 3; said flanges having edge portions to abut said walls and space the frame therefrom.

8. In a means for supporting a frame in a bee hive; supporting members pivoted to the ends of the frame and movable from vertical to horizontal positions, the outer ends of said members when horizontally positioned projecting from said frame for reception in recesses in opposed walls of the hive, and the inner ends of said members when vertically positioned projecting vertically below the frame when the latter is inverted for the purpose set forth 9. In a means for supporting a frame in a bee hive; supporting plates at the upper corners of the frame normally resting on the top bar thereof and having their outer ends projecting beyond the end bars of said frame for reception in recesses in opposed walls of a hive, flanges extending downwardly from said plates, and transverse horizontal pivots connecting said flanges with the frames and permitting movement of the plates to vertical positions, said plates when in the last named positions having their inner ends projecting vertically below the frame when the latter is inverted for the purpose set forth.

10. In a means for supporting a vertical frame in a bee hive, a pair of elongated sheet metal plates resting normally on the top bar of the frame and projecting therefrom for reception in recesses in opposed walls of a bee hive, vertical flanges integral with said plates and extending downwardly therefrom, and transverse horizontal pivots connecting said flanges with said frames and permitting movement of said plates to vertical positions in which they project vertically from the frame, said flanges terminating in inwardly spaced relation with the outer ends of said plates but in outwardly spaced relation with the ends of the frame to abut the opposed hive walls and space the frame therefrom, said flanges having stamped portions projecting laterally from the frame to space the latter from an adjacent frame.

11. The combination with a hive body having recesses, of frames removable vertically from the body, and movable supports on the frames to enter said recesses when the frames are inserted and automatically moved to retracted positions on lifting the frames from the body.

In testimony whereof I have hereunto affixed my signature.

JOHN F. POE.